Apr. 10, 1923.
E. MILLNER
1,451,623
SOLDERING IRON
Filed May 3, 1920
2 sheets-sheet 1
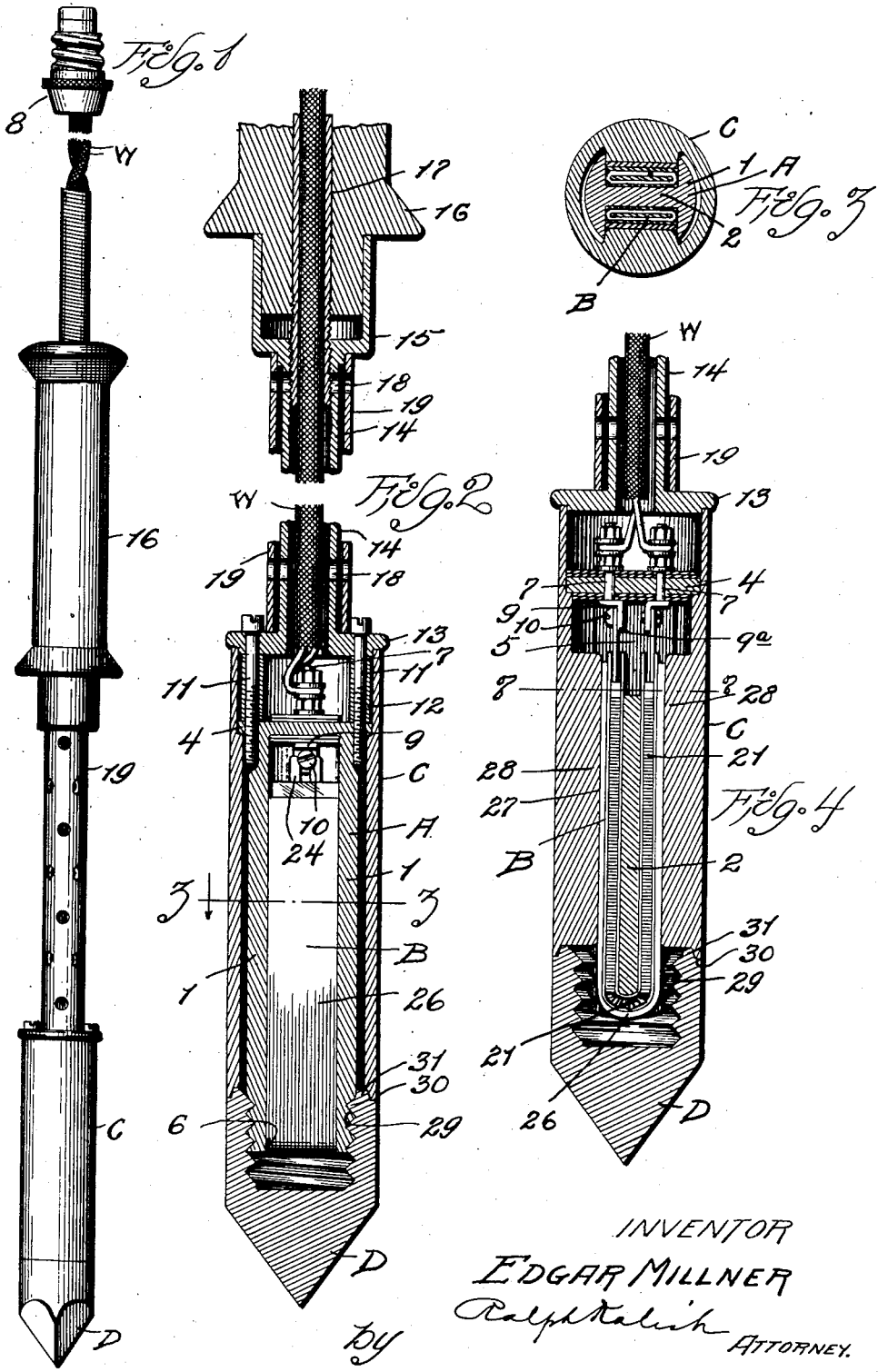
INVENTOR
EDGAR MILLNER
by Ralph Kalish
ATTORNEY.

Apr. 10, 1923.
E. MILLNER
1,451,623
SOLDERING IRON
Filed May 3, 1920
2 sheets-sheet 2
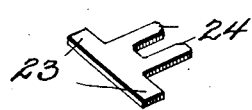
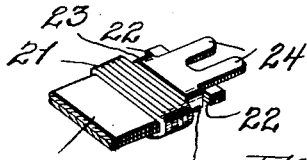
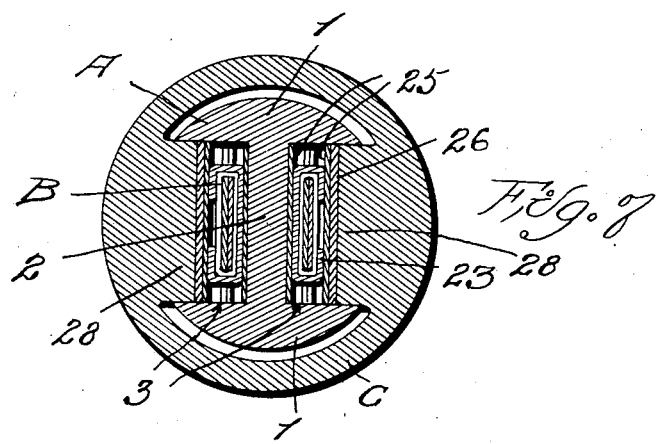
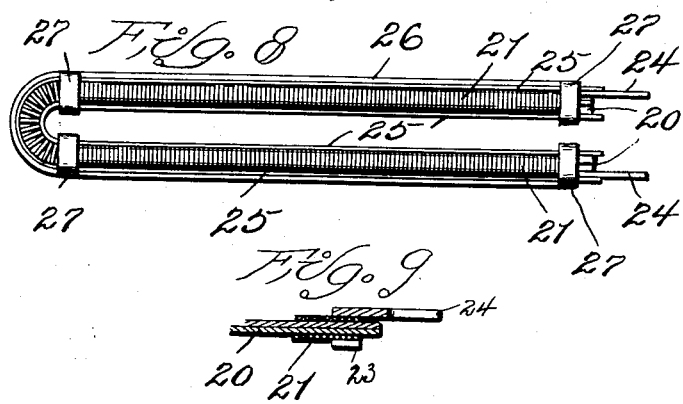
INVENTOR
EDGAR MILLNER
Ralph Kalish
ATTORNEY.
by Patented Apr. 10, 1923.

1,451,623

UNITED STATES PATENT OFFICE.

EDGAR MILLNER, OF ST. LOUIS, MISSOURI.

SOLDERING IRON.

Application filed May 3, 1920. Serial No. 378,511.

*To all whom it may concern:*

Be it known that I, EDGAR MILLNER, a citizen of the United States, residing at the city of St. Louis, State of Missouri, have invented certain new and useful Improvements in Soldering Irons, of which the following is a specification, reference being had to the accompanying drawings, forming a part thereof.

This invention relates generally to soldering irons and, more particularly, to certain new and useful Improvements in soldering-irons of the electrically heated type.

The principal objects of my present invention are to provide an electric soldering-iron in which the parts are so constructed and co-operate that the iron, and especially the working-tip thereof, may be raised to, and afterwards maintained at, efficient working temperature with practically a minimum of current consumption; to provide an electric soldering-iron in which the parts may be assembled with facility and are adapted for ready and convenient repair, renewal, or replacement; and to improve generally upon and simplify the construction of soldering irons of the class described.

With the above and other objects in view, my present invention resides in the novel features of form, construction, arrangement, and combination of parts hereinafter described and afterwards pointed out in the claims.

In the accompanying drawings—

Figure 1 is an elevational view of a soldering iron constructed in accordance with and embodying my invention;

Figure 2 is an enlarged longitudinal sectional view of the iron;

Figure 3 is a transverse sectional view of the iron taken approximately on the line 3—3, Figure 2;

Figure 4 is also an enlarged longitudinal sectional view of the iron, taken, however, at approximately right angles to the section of Figure 2;

Figure 5 is a perspective view of one of the terminals for the heating-element of the iron;

Figure 6 is a perspective view of one of the terminal-ends of the heating-element of the iron;

Figure 7 is an enlarged transverse sectional view of the iron taken approximately on the line 7—7, Figure 4;

Figure 8 is an enlarged side elevational view of the heating-element; and

Figure 9 is a fragmental longitudinal sectional view of the heating element.

Referring now more in detail to the said drawings, in which like reference characters refer to like parts throughout the several views, the body or casing of the soldering-iron comprises an inner section A approximately H-shaped in transverse section, as seen in Figures 2 and 4, section A consisting preferably integrally of a pair of oppositely-disposed longitudinal wall-members 1—1 preferably arcuated on their outer face, and a longitudinally disposed web 2 disposed between and connecting the walls 1 to provide the section A with oppositely-disposed longitudinal recesses 3—3. Fixed to or integral with, and providing an annular shoulder at, the forward or inner ends of the walls 1 and forming part of the body-section A, is a disk 4. The web 2 is cut away at its forward end, as at 5, and at its rear or outer end is reduced in length relatively to the walls 1 to provide the section A with a rear end recess, as at 6, all for purposes shortly appearing. Extending in fixed position transversely through, and insulated from, the end-disk 4, is a pair of binding-posts 7 adapted for electrical connection upon one side of the disk 4, as shown, with wires W, which, in turn, it may be here stated, are adapted for inclusion by means of a plug or the like 8 in any convenient circuit. Disposed upon the other side of the disk 4 and within the space 5 provided at the forward end of the web 2, and fixed to and substantially forming part of the posts 7, are preferably oppositely-disposed angle-members 9—9 providing the inner terminals of the posts 7. As seen particularly in Figure 4, the posts 7 and their inner terminals 9 are so disposed relatively to the web 2 that portions $9^a$ of the terminals 9 extend in planes approximately parallel with, but slightly spaced from, the opposite side faces of the web, each of the terminal-portions $9^a$ being provided with a suitable screw or the like 10 adapted for binding engagement with the terminals of the heating-element hereinafter described for detachably securing the heating-element or unit in electrical engagement with the posts 7.

Fixed to the end-disk 4 as by suitably elongated screws or the like 11, and spaced from the disk 4 by tubular spacing-members or the like 12 sleeved upon the screws 11, as seen especially in Figure 2, is a second or handle-disk 13, preferably integral at one end with which is a suitable tubular-member or handle-shank 14 provided at its other end with a socket 15. Seated and preferably suitably fixed in the socket 15, is a suitable handle or hand-grip 16 having a longitudinal bore, as at 17, communicating with the bore of the tubular shank 14, the wires W, suitably insulated, as shown, being threaded outwardly from the binding-posts 7 through the shank 14 and handle 16 and provided at their outer ends with the plug 8. The shank 14 may be perforated, as at 18, and enclosed within a second perforated tube 19 disposed between the disk 13 and the end wall of the socket 15, as illustrated in Figure 2, to permit free radiation of excessive heat from the body of the iron and thereby obviate any uncomfortable heating of the socket 15 or handle-grip 16.

The heating-unit or element B is substantially, as best seen in Figures 4 and 8, in the form of an elongated U and includes a suitable flat insulation-core 20, arranged in suitable strands upon which and throughout its length, is resistance wire 21, the core 20 being preferably recessed, as at 22, upon its opposite sides and adjacent both its ends. Disposed at and upon the ends of the core and having lateral ears 23 fitting in the recesses 22 and clinched upon the core in electrical engagement with the resistance wire 21, are copper or other suitable substantially rigid terminals 24 longitudinally bifurcated, as best seen in Figures 5 and 6, for convenient electrical engagement with the terminals 9 and their binding screws 10. Disposed upon the resistance wire 21 throughout the length, and upon both sides, of the core 20, to prevent short-circuiting, are strips of mica or other suitable insulation material 25; and disposed upon one, which I will designate the outer, mica strip or section, is a substantially U-shaped metallic cover sheet 26. This cover-sheet or section 26 is suitably formed or provided with lateral tongues 27, which are bent or crimped around and upon the inner mica section and the several parts of the heating-element or unit firmly secured operatively together in fixed relation in a most simple, but efficient manner.

This heating-element or unit B is of a length and width relatively to body-section A to straddle the web 2 and neatly fit in the longitudinal and end recesses 3 and 6 of the section A, as seen in Figures 2 and 4, and when so fitted in and upon the body-section A, its terminals 24 conveniently straddle the screws 10 of, and fit flatwise upon, the terminal-portions 9a of the binding-posts 7. Manipulation of the screws 10, easily then accomplished, serves to readily detachably secure the heating-unit electrically to the terminals 9.

The outer or co-operating section of the body of the iron is in the form of a metallic tube C, which is adapted to fit lengthwise upon and for the most part enclose the body-section A and the heating-unit B, section C being of a length to expose only the outer end of the section A and the corresponding bight-portion of the heating-unit B and to engage at its inner end with the rear face of the handle-disk 13 and thereby conceal and protect the binding-posts 7 and the inner connected ends of the wires W. Interiorly, the tube or section C is suitably formed or provided longitudinally with approximately diametrically opposite elongated bosses or enlargements 28 adapted, when the section C is in enclosing position upon the inner body-section A and the heating-unit B, to substantially unpinge upon, and to thereby have substantially direct heating-engagement with, the outer face of the metallic cover-section 26 of the heating-unit B.

The walls 1 at the exposed rear end of the inner body-section A are suitably threaded, as at 29; and threaded upon the section A to engage the outer body-section C, is an internally threaded and chambered member or cap D providing or forming the working-tip of the tool, this tip or cap D having a shape or configuration at its working end to best meet the requirements of the particular work, such as, for instance, soldering, branding, or the like, being done. As best seen in Figures 2 and 4, section C is formed internally at its rear end with a beveled annular shoulder, as at 30, adapted for co-operation with a correspondingly beveled annular extension 31 of the top D to form a tight joint between, and compensate for possible wear of the threads of, the section A and tip D.

In use or operation, a heating-element or unit B is readily fitted in its described position upon, and straddling the web 2 of, the inner body-section A and electrically engaged at its terminals 24 with the terminals 9 of the posts 7. A cooperating body-section C is then sleeved lengthwise upon the section A and heating-element B into the enclosing position thereof illustrated particularly in Figures 2 and 4, with its said bosses or enlargements 28 substantially impinging upon, and thereby directly engaging with, the heating-unit B. A cap D is then threaded upon the inner section A to engage the outer section C and serves not only to lock the body-sections A and C operatively together, but also to provide an effective working-tip for the tool. With the parts or sections A, C, and D so assembled, and it will be observed that such operation may be readily and easily accomplished, the heating-unit or element B is completely enclosed, and the heat generated thereby when the tool is connected up in circuit is not only directly transmitted and conducted through the web and walls of section A and the wall of section C to the tip D, but is also directly radiated to the tip D from the bight-portion of the heating-unit B, which fits neatly within the chamber of the tip, as seen in Figures 2 and 4.

I have found from experience that my new tool is exceedingly efficient in use, is economical in use of current, and may be both raised to, and maintained at, working temperature with practically a minimum of current consumption, the heat generated by the heating-element B being utilized with little, or no, waste. It will be evident that renewal or replacement of the heating-unit B or of any of the other parts of the tool may be made, when required or necessary, with convenience and facility; and it is to be understood that changes in the form, construction, arrangement, and combination of the several parts of the iron may be made and substituted for those herein shown and described without departing from the nature and principle of my invention.

Having thus described my invention, what I claim and desire to secure by Letters Patent is:

1. A heating tool including, in combination, an inner metallic body-section provided with insulated terminals, a heating element fitting upon said section and adapted for electrical connection with the terminals, and an outer metallic body-section enclosing both the inner-section, the heating-element, and the terminals.

2. A tool of the class described including, in combination, an inner heat-conducting body-section provided with insulated terminals, a heating-element fitting upon said section and adapted for electrical connection with the terminals, an outer heat-conducting body-section fitting around and enclosing both the inner section, the heating-element, and the terminals, and a tip having engagement with both the body-sections.

3. A tool of the class described including, in combination, an inner heat-conducting body-section provided with insulated terminals, a heating-element fitting renewably upon said section and adapted for electrical connection with the terminals, an outer heat-conducting body-section fitting removably around and enclosing both the inner section, the heating-element, and the terminals, and a metallic cap having engagement with both the body-sections for detachably locking the same together and providing a renewable working tip for the tool.

4. A tool of the class described including, in combination, an inner heat-conducting metallic body-section provided with insulated line terminals, said section being substantially H-shaped in transverse section, an approximately U-shaped heating element fitting removably upon said section and adapted for electrical connection with the terminals, an outer tubular heat-conducting section removably surrounding and providing an enclosing shell for both the inner section, the heating-element, and the terminals, and a metallic cap having engagement with the body-sections for detachably locking the same together and providing a renewable working top for the tool.

5. A tool of the class described comprising a heating-element, in combination with an enclosing casing for the element including an inner section, an outer section sleeved upon the inner section, and a working-tip having engagement with both sections for locking the same operatively together.

6. A tool of the class described comprising a heating-element, in combination with an enclosing casing for the element including an inner section threaded at one end, an outer section sleeved upon the inner section, and a working-tip threaded upon the inner section and having engagement with the outer section for locking the sections operatively together.

7. A tool of the class described comprising, in combination, an inner casing-section threaded at one end and provided with terminals, a heating-element fitting upon said section and adapted for electrical engagement with the terminals, an outer section sleeved upon the inner section to expose its threaded end and a portion of the heating-element, and a working-tip threaded upon the inner section and having engagement with the outer section for locking the sections operatively together and enclosing said portion of the heating-element.

8. A tool of the class described comprising, in combination, an inner casing-section substantially H-shaped in cross-section, the section being threaded at one end, and provided with terminals, a substantially U-shaped heating-element fitting upon and straddling the web of the section and adapted for electrical engagement with the terminals, an outer casing-section sleeved upon the inner section to expose the threaded end thereof and the bight-portion of the element, and a chambered working-tip threaded upon the inner section and having engagement with the outer section for locking the sections operatively together and enclosing the bight-portion of the element.

9. A heating-tool comprising a casing including an inner body-section provided with line terminals, in combination with a heating-element adapted to fit upon the section and having bifurcated terminals adapted for engagement with the terminals of the section.

10. A heating tool comprising a casing including an inner body-section provided with angular terminal-plates and posts engaging a leg of the plates, in combination with a heating-element adapted to fit upon the section and having bifurcated terminals adapted to seat upon the plates and engage said posts.

11. In a heating tool, a casing comprising a body section substantially H-shaped in cross section, the same including a pair of spaced walls, a connecting-web disposed between the walls, and an end-disk fixed to the walls, in combination with terminals on the disk including flat-plates and posts on the plates, and a substantially U-shaped heating-element fitting upon the section and straddling the web thereof and having bifurcated terminals adapted for electrical engagement with the plates and posts.

12. A tool of the class described including a heating-element comprising a flat core, a resistance-wire disposed in strands upon the core, and a terminal having lateral extensions clinched upon the core and engaging electrically with the resistance-wire.

13. A tool of the class described including a heating-element comprising a core, resistance-wire disposed in strands upon the core, and a bifurcated blade-terminal having lateral portions clinched upon the core and engaging electrically with the resistance-wire.

14. A tool of the class described including, in combination, an inner body-section, provided with line-terminals, a handle fixed to the section, wires extending through the handle and engaging electrically with the terminals, a heating-element fitting upon the section and adapted for electrical engagement with the terminals, and means for enclosing the body-section and heating element.

15. A tool of the class described including, in combination, an inner body-section provided with line-terminals, a handle fixed to the section, wires extending through the handle and engaging electrically with the terminals, a heating-element fitting upon the section and adapted for electrical engagement with the terminals, and means for enclosing the inner section and heating-element and concealing the terminals and the connected ends of the wires.

16. A tool of the class described including, in combination, an inner body-section provided with line terminals, a handle comprising a disk fixed to, and spaced from, the inner section, a heating element fitting upon the section and adapted for electrical engagement with the terminals, circuit-connecting-wires extending through the handle-disk and engaged electrically with the terminals, and means comprising an outer-body-section sleeved over the inner section to engage the handle-disk for enclosing the body-section and heating-element and concealing the terminals and the connected ends of the wires.

17. A tool of the class described including, in combination, an inner body-section provided with line terminals, a handle comprising a disk fixed to, and spaced from, the inner section, a heating element fitting upon the section and adapted for electrical engagement with the terminals, circuit-connecting-wires extending through the handle-disk and engaged electrically with the terminals, an outer body-section sleeved upon the inner body-section to engage the handle disk, and a cap having engagement with the sections for locking the same operatively together and providing a working tip for the tool.

18. A tool of the class described including an inner body-section, a heating-element having a metallic cover-section fitting upon said body-section, and an enclosing outer body-section engaging directly with the cover-section of the heating-element.

19. A tool of the class described including an inner body-section comprising a pair of spaced walls and a connecting web between the walls, a substantially U-shaped heating-element disposed between the walls and straddling the web, and an outer body-section sleeved upon the inner body-section and provided internally with diametrically opposite enlargements for engaging directly with the heating-element.

20. A tool of the class described including, in combination, an inner-section, a heating element fitting upon said section, an outer tubular body section enclosing the inner-section and heating element, a cap having engagement with an end of both sections and providing a working tip, a handle disposed upon the opposite end of the outer section, securing means for handle having engagement with the inner-section, and line wires disposed through the handle and having electrical engagement with the heating element.

21. A tool of the class described including an inner section, a heating element fitting upon said section, and an outer section adapted to surround both the inner section and the heating element.

22. A tool of the class described including an inner section, a heating element fitting upon said section, and an outer tubular section adapted to provide an enclosing shell for both the inner section and the heating element.

23. A tool of the class described including an inner section substantially H-shaped in transverse section, an approximately U-shaped heating element fitting upon said section, and an outer tubular section adapted to provide an enclosing shell for both the inner section and the heating element.

24. A tool of the class described including an inner section provided with line terminals, said section being substantially H-shaped in transverse section, an approximately U-shaped heating element fitting upon said section and adapted for electrical engagement with the terminals, an outer tubular section surrounding and providing an enclosing shell for both the inner section and heating-element, and means for securing the sections operatively together.

In testimony whereof, I have signed my name to this specification.

EDGAR MILLNER.